L. W. ANDERSON.
SHAPING MACHINE.
APPLICATION FILED JUNE 1, 1908.
916,962.                                Patented Apr. 6, 1909.
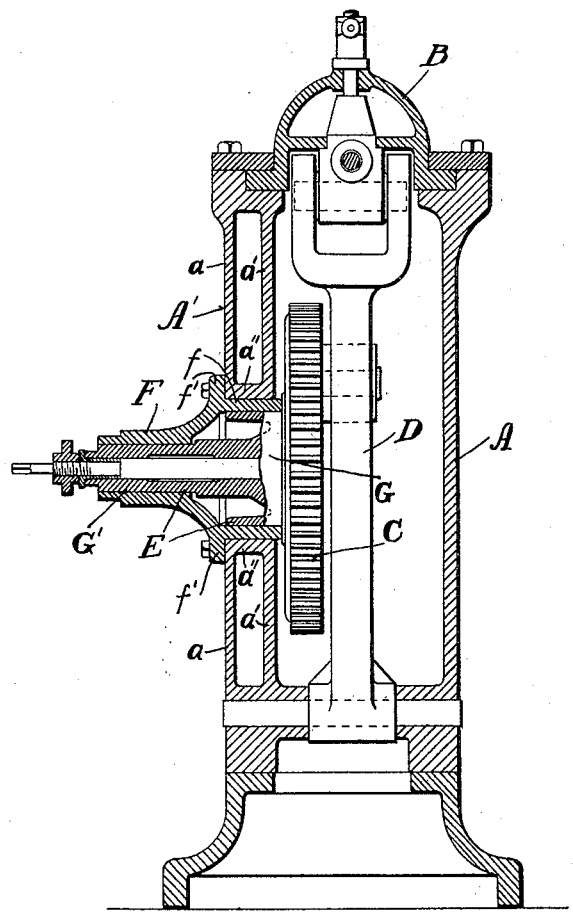
Witnesses.
Homer Bradford.
A. H. Parker
Inventor
Lars W. Anderson
by Stem & Mehllope
his Attorneys.

UNITED STATES PATENT OFFICE.

LARZ W. ANDERSON, OF CINCINNATI, OHIO, ASSIGNOR TO THE CINCINNATI SHAPER COMPANY, OF CINCINNATI, OHIO, A CORPORATION.

SHAPING-MACHINE.

No. 916,962.　　　　Specification of Letters Patent.　　　　Patented April 6, 1909.

Application filed June 1, 1908. Serial No. 435,891.

*To all whom it may concern:*

Be it known that I, LARZ W. ANDERSON, a citizen of the United States, and a resident of Cincinnati, in the county of Hamilton and State of Ohio, have invented a certain new and useful Improvement in Shaping-Machines, of which the following is a full, clear, and exact description, reference being had to the accompanying drawing, which forms part of my specification.

My invention relates to shaping machines and particularly to the construction of the column and the manner of supporting the crank gear journal thereon.

The object of my invention is to provide a simple construction of the column wall and method of attachment of the housing by means of which a strong, rigid and long bearing for the crank gear journal may be secured.

My invention relates to the same general type of machine as that shown in the application of James C. Steen and Norman B. Chace, Serial #307,002, filed March 20, 1906, shaping machines.

The drawing presents a vertical section through the column of a shaping machine on the plane passing through the axis of the crank gear, the gear itself, however, being shown in elevation.

A is the column, B, the ram, C, the crank gear, D, the rocker arm, and E, the crank gear journal.

A' is the supporting wall of the column and F, the housing in which the crank gear journal is supported. The housing F approximates a cone in shape and is provided at its column end with a cylindrical extension $f$ and with a circular flange $f'$ at right angles to said extension, adapted to bear against the outer wall of the column. The wall itself is double in construction comprising the two plates $a$ $a'$, joined together at the housing by a cylindrical flange $a''$. The cylindrical projection $f$ of the housing fits snugly within the flange $a''$ which joins the two portions of the wall.

The crank gear journal comprises concentric cylinders G G', the one of large diameter and the other of considerably smaller diameter. The cylindrical projection $f$ is turned down on its inner face to form a bearing for the cylinder G and the outer end of the housing forms a bearing for the cylinder G'.

It is unnecessary to describe the operation of the crank gear and the other parts of the machine as they do not in any way relate to my invention.

It is apparent that by the construction described a rigid support for the housing F is secured and this in a very efficient and economical manner, and in addition the necessary support is produced without departing from the simple lines of the ordinary shaping machine.

Having thus described my invention, what I desire to claim as new and to cover by Letters Patent is:—

1. In a shaping machine, in combination with the crank gear, the journal formed on said crank gear, comprising cylindrical bearing surfaces, one of large diameter adjacent the gear, and the other of reduced diameter projecting beyond the first, and a housing having similar bearing surfaces, the column of the machine, the supporting wall thereof comprising two plates at a distance from each other and joined together at the housing by a cylindrical flange, the larger bearing cylinder of the housing located within this flange and the housing having a flat disk resting against and secured to the outer plate of the wall.

2. In a shaping machine, in combination with the crank gear, the journal formed on said crank gear, comprising cylindrical bearing surfaces, one of large diameter adjacent the gear, and the other of reduced diameter extended to a distance beyond the gear, and a housing having similar bearing surfaces, the column of the machine, the supporting wall thereof comprising two plates properly braced and supported at a distance from each other and joined together at the housing by a cylindrical flange, the housing having a cylindrical flange fitting within the flange joining the said plates and a disk-like flange at right angles thereto resting against and secured to the outer plate of the wall.

LARZ W. ANDERSON.

Witnesses:
　WM. E. FISCHER,
　W. J. FOSTER.